United States Patent [19]
Curran et al.

[11] Patent Number: 5,231,823
[45] Date of Patent: Aug. 3, 1993

[54] SUPERVISORY CONTROL SYSTEM

[75] Inventors: Joseph J. Curran, Weymouth, Mass.; Martha J. Nagy, Merrimack, N.H.

[73] Assignee: General Electric Company, Cincinnati, Ohio

[21] Appl. No.: 748,610

[22] Filed: Aug. 22, 1991

[51] Int. Cl.$^5$ .............................................. F02C 9/28
[52] U.S. Cl. .................................................. 60/39.281
[58] Field of Search .................. 60/39.281, 39.282, 243

[56] References Cited

U.S. PATENT DOCUMENTS

| | | | |
|---|---|---|---|
| 3,930,366 | 1/1976 | Nelson | 60/39.281 |
| 4,380,148 | 4/1983 | Burrage et al. | 60/39.281 |
| 4,423,593 | 1/1984 | Zagranski et al. | 60/39.281 |
| 4,449,360 | 5/1984 | Evans | 60/39.281 |
| 4,625,510 | 12/1986 | Evans | 60/39.281 |
| 4,993,221 | 2/1991 | Idelchik | 60/39.03 |
| 5,020,316 | 6/1991 | Sweet et al. | 60/39.282 |
| 5,029,441 | 7/1991 | Parsons | 60/39.281 |

OTHER PUBLICATIONS

"T700 Fuel and Control System" 29th Annual Forum of the American Helicopter Society, May 1973.

*Primary Examiner*—Louis J. Casaregola
*Attorney, Agent, or Firm*—Bernard E. Shay; Jerome C. Squillaro

[57] ABSTRACT

In the present invention, the DEC output voltage is limited by comparing the DEC output and the Collective input to a predetermined maximum acceleration and generating an error signal when the maximum acceleration is exceeded. The error signal is fed back to the DEC and acts to limit its output. More particularly, the present invention is directed to a method of limiting the output of a DEC by generating a first signal representative of the acceleration demanded by the DEC, generating a second signal representative of the acceleration demanded by the collective, adding the first and second signals to form a third signal representative of the total demanded acceleration, generating a fourth signal representative of the maximum allowable demanded acceleration, subtracting the third signal from the fourth signal to obtain an error signal, and limiting the DEC output signal according to the error signal.

3 Claims, 2 Drawing Sheets

SUPERVISORY CONTROL SYSTEM

The present invention is directed to control systems for helicopters which use gas turbine engines and, more particularly, to a helicopter control system adapted to limit the output of the Digital Electronic Control (DEC).

BACKGROUND OF THE INVENTION

In helicopters which use gas turbine engines, the acceleration of the engine may be controlled by signals from both the cockpit (e.g. the collective pitch signal) and the supervisory electronic control (e.g. the Digital Electronic Control output). These two signals control the volume of fuel delivered from the Hydromechanical Unit (HMU) to the fuel nozzles in the engine, thus controlling engine acceleration.

The HMU normally includes limiting electronics or mechanical apparatus which prevent the acceleration of the gas turbine engine from exceeding predetermined limits. This limit may be referred to as the acceleration schedule or accel schedule. In many applications, the Accel Schedule is implemented by, for example, mechanical cam shafts which prevent the fuel flow from exceeding predetermined limits for various engine conditions. The HMU is adapted to receive a number of signals, including the DEC output and the collective output and to generate therefrom a "fuel demand signal". The fuel demand signal is used by the HMU to control the flow of fuel to the engine.

Normally, the fuel demand signal is not limited by the accel schedule. However, the fuel demand inputs to the HMU may combine to form a fuel demand signal that exceeds accel schedule. In this case the HMU controls fuel flow according to the Accel Schedule even if the fuel demand signal continues to increase. However, changes in engine conditions and/or control inputs may result in a decrease in fuel demand. In an ideal system, when the fuel demand decreases the HMU would respond immediately, delivering fuel according to the demand. However, delays in the controls, the engine and the HMU normally result in a delay between the time when the fuel demand signal decreases and the time when the HMU responds. It would, therefore, be advantageous to provide a system wherein the delay between a decrease in the fuel demand signal and an actual decrease in fuel flow is reduced.

SUMMARY OF THE INVENTION

In the present invention, the DEC output voltage is limited by comparing the DEC output and the collective pitch input to a predetermined maximum acceleration and generating an error signal when the maximum acceleration is exceeded. The error signal is fed back to the DEC and acts to limit its output.

More particularly, the present invention is directed to a method of limiting the output of a DEC by generating a first signal representative of the acceleration demanded by the DEC, generating a second signal representative of the acceleration demanded independently of the DEC by the collective, adding the first and second signals to form a third signal representative of the total demanded acceleration, generating a fourth signal representative of the maximum allowable demanded acceleration, subtracting the third signal from the fourth signal to obtain an error signal, and limiting the DEC output signal according to the error signal.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
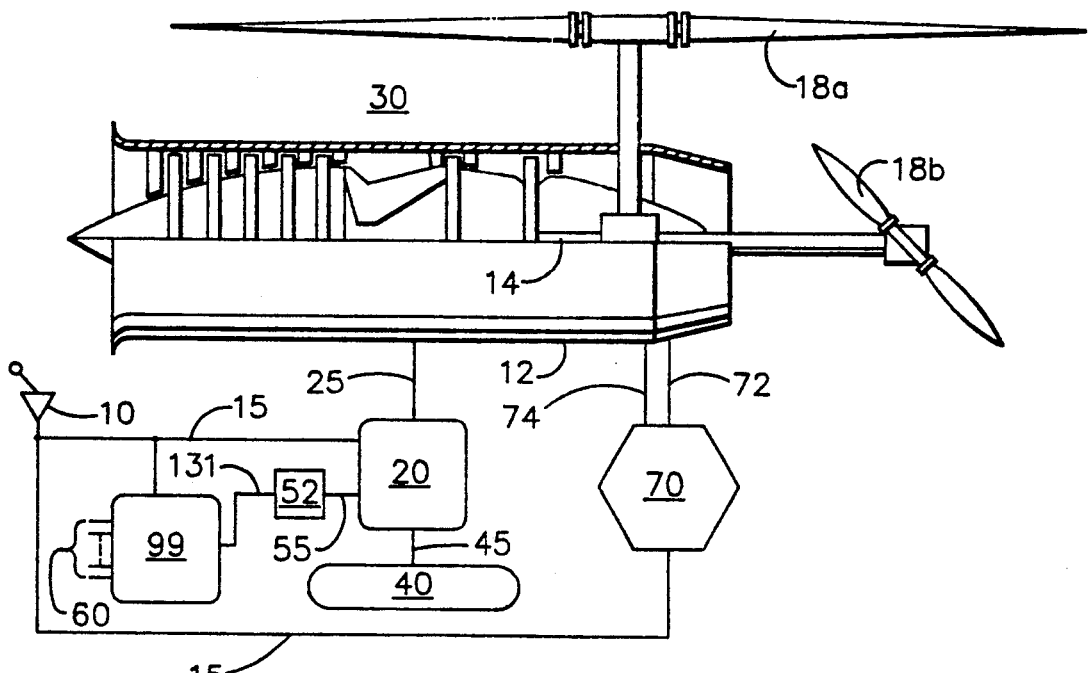
FIG. 1 is a simplified block diagram of a fuel supply system for a gas turbine engine.

FIG. 1 is a simplified diagram of a helicopter fuel supply system. In FIG. 1, a gas turbine engine system 30 comprises a turboshaft gas turbine engine 12 having an output drive shaft 14. The drive shaft 14 is coupled to at least one airfoil. In FIG. 1, the drive shaft 14 is coupled to first and second airfoils, 18a and 18b, respectively. The first airfoil 18a represents the main airfoil and the second airfoil 18b represents a supplementary airfoil exemplary of helicopter-type systems.

In FIG. 1, gas turbine engine 30 receives fuel from hydromechanical unit (HMU) 20 through fuel supply system 25. HMU 20 receives fuel from fuel source 40 (e.g. a fuel tank). HMU 20 includes a fuel pump and is adapted to supply fuel to engine 30 according to control input signals (e.g., signals 15 and 55). HMU 20 further includes apparatus and/or control mechanisms which limit the fuel flow under certain, predetermined, conditions. The limits placed on fuel flow by the HMU may be referred to as the accel schedule. The accel schedule may reflect, for example, the maximum fuel flow which can be supplied to the gas turbine engine under the present operation conditions without risking stalls. Thus, input signals 15 and 55 may demand, and the HMU will supply, fuel to the gas turbine engine as long as the demanded fuel flow does not exceed the accel schedule.

Digital Electronic Control (DEC) 99 receives engine status inputs 60 which may comprise, for example, power turbine speed (NP) and turbine gas temperature (T4.5). DEC 99 may also receive control inputs such as collective signal 15. DEC 99 includes a central processor and other circuitry adapted to generate signals for controlling various parameters of engine 30. One of the outputs of DEC 99 is signal 131, which is representative of the fuel flow requested by DEC 99.

Collective pitch control 10 is an operator (pilot) input. Collective control 10 supplies control signal 15 to DEC 99, HMU 20 and load generator 70. Collective 10 is adjusted by the pilot. Signal 15 is representative of the position of helicopter collective control 10.

Load generator 70 may be, for example, the transmission which drives airfoils 18a and 18b. Inputs would, therefore, 72 and 74 represent the load generated by airfoils 18a and 18b.

In FIG. 1, trim servo 52 receives signal 131 and generates output signal 55. HMU 20 receives signal 55. Trim servo 52 is adapted to convert fuel demand signal 131 from DEC 99 to a signal which may represent, for example, a piston position or port opening size in HMU 20. Output signal 55 of torque motor 52 may, therefore, be representative of the mechanical position of, for example, a valve position in HMU 20 which results in a fuel flow corresponding to the flow demanded by DEC 99. Trim servo 52 may comprise, for example, analog to digital and digital to analog signal conditioning circuitry which drives a torque motor adapted to convert the electrical signals to mechanical signals.

Figure 2:
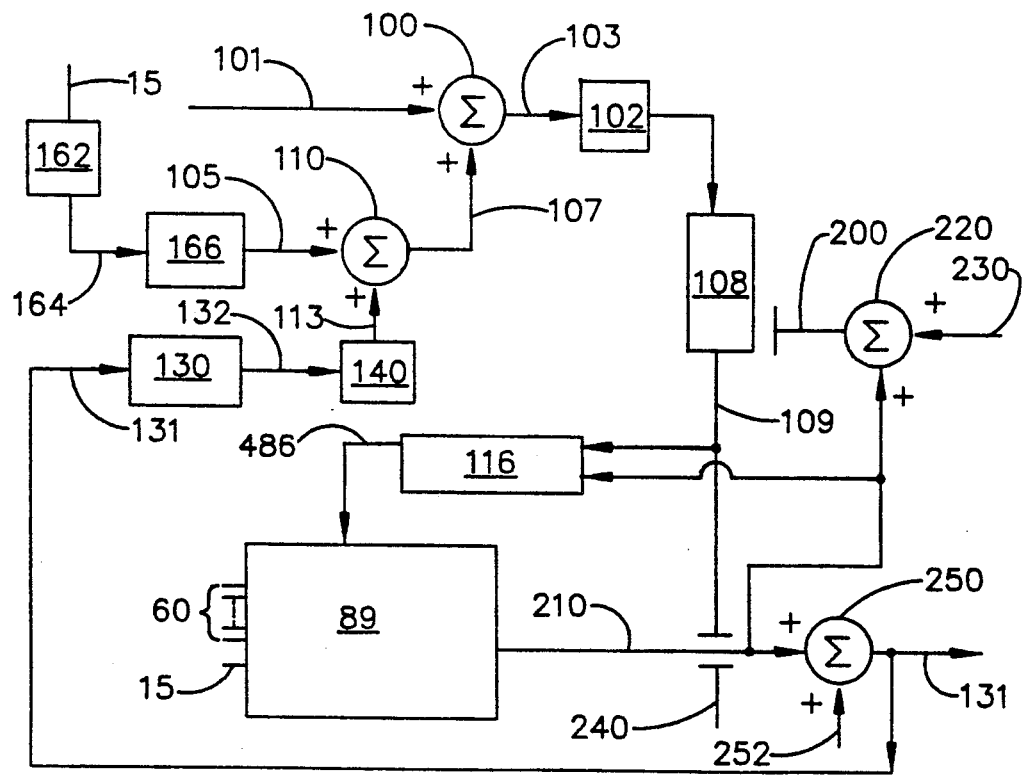
FIG. 2 is a block diagram of an embodiment of the present invention for controlling the fuel supply system illustrated in FIG. 1.

FIG. 2 is a block diagram of DEC according to the present invention. In the present invention, DEC output signal 131 and collective signal 15 are converted to signals 105 and 113 respectively. Signals 105 and 113 are representative of the acceleration of core speed demanded by the collective pitch and the DEC, respectively. Signals 105 and 113 are summed to form a signal 107 which is representative of the core speed acceleration demanded by the combination of the collective signal 15 and the DEC signal 131 (i.e. total demanded acceleration). Total demanded acceleration signal 107 is then subtracted from a constant signal 101. Signal 101 is representative of the maximum allowable acceleration. If the resulting error signal 103 is negative, output signal 131 of the DEC 99 is limited by limit signal 109 according to the magnitude of the negative error signal.

More particularly in the control system illustrated in FIG. 2, lagged rate filter 162 receives collective pitch signal 15. The output of lagged rate filter 162 is rate signal 164 which is representative of the rate of change of collective signal 15. Lagged rate filter 162 may have a transfer function of, for example:

$$S/(0.1S+1)$$

where S is the laplacian operator.

The control signals illustrated and described herein have been assumed to be in analog form and the laplace transform is used to illustrate transfer functions for convenience and clarity of explanation. It will be apparent to those of skill in the art that it may be advantageous to transmit and calculate the control signals described herein using digital methods. If the control signals are transmitted in digital form, the transfer functions described herein would be converted to, for example, Z-Transforms by conventional transform conversion methods.

In FIG. 2, amplifier 166 receives signal 164 from lagged rate filter 162 and multiplies it by a predetermined gain. The gain of amplifier 166 may be, for example, proportional to the relationship between the engine core speed rate of change (% NG/second) and the collective rate of change (% LDS/second). The gain of amplifier 166 may be a predetermined constant or it may be a function of one or more engine parameters. Thus, the output of amplifier 166 is a signal 105 which is proportional to the expected engine core speed rate of change for the actual collective rate of change independent of the DEC.

In FIG. 2, lagged rate filter 130 receives signal 131. The output of lagged rate filter 130 is a signal 132 which is representative of the rate of change of DEC output signal 131. Lagged rate filter 130 may have a transfer function of, for example:

$$S/(0.1S+1)$$

where S is the laplacian operator.

In FIG. 2, amplifier 140 receives signal 132 from lagged rate filter 130 and multiplies it by a predetermined gain. The gain of amplifier 140 may be, for example, proportional to the relationship between the engine core speed rate of change (% NG/second) an change of DEC output 131. The gain of amplifier 140 may be a predetermined constant or it may be a function of one or more engine parameters. Thus, the output of amplifier 140 is a signal 113 which is representative of the expected engine rate of change for the actual DEC output signal rate of change.

In FIG. 2, summing circuit 110 receives signals 105 and 113 and sums them to form signal 107. Signal 107 is a signal which is representative of the expected rate of change in engine core speed (NG) as a result of changes in collective signal 160 and DEC signal 15.

In FIG. 2, signal 101 may be, for example, the core speed (NG) reference rate limit signal. Signal 101 is intended to be representative of the maximum rate of change in core speed. Demanded rate changes greater than those represented by signal 101 may, for example, cause the engine to stall. Signal 101 is, therefore, related to the accel schedule in the HMU and may be, for example, equal to or slightly greater than the accel schedule. Alternatively, signal 101 may be an empirically derived value (constant or variable).

Summing circuit 100 receives signals 101 and 107. The output of summing circuit 100 is a signal 103 which is representative of the difference between signals 101 and 107. Therefore, signal 103 is representative of the amount by which the demanded rate of change in core speed, as represented by signal 107, exceeds (for a negative 103) or falls short of (for a positive 103) the maximum allowable core speed rate of change, as represented by signal 101.

In FIG. 2, signal 103 is multiplied by a predetermined gain in amplifier 102. The gain of amplifier 102 is a calculated value which provides loop stability to the control system of the present invention. The gain of amplifier 102 may include dynamics for loop stability.

In FIG. 2, integrator 108 receives and integrates signal 103. The output of integrator 108 is a signal 109 which becomes the DEC output signal when output 210 from DEC control circuitry 89 is greater than signal 109. Therefore, signal 210 does not exceed signal 109. The transfer function of integrator 108 may be, for example:

$$1/S$$

where S is the laplacian operator.

Integrator 108 includes an input 200 which limits the output of integrator 108. Signal 200 is slightly higher than signal 210, for example, in the embodiment of FIG. 2, signal 200 is the sum of signal 210 with a small constant 230. Therefore, when signal 109 is not acting as a limiter, it tracks signal 210.

In FIG. 2, a positive signal 103 indicates that the demanded fuel flow does not exceed desirable limits. It will be apparent that a constant positive input to integrator 108 will result in a continuous rise in the level of output signal 109 in the absence of limiting signal 200. A change in signal 103 to a negative valve results in a decreasing output from integrator 108. However, if signal 109 substantially exceeds signals 210, it will take time for signal 109 to act to limit signal 210. Therefore, by forcing the output of integrator 108 to track signal 210, when it is not being limited, signal 200 ensures that, once signal 103 goes negative, output signal 131 will be limited immediately. Output signal 210 is further limited to a minimum value by signal 240. Signal 240 acts as a lower limit to signals 210 and 109, preventing the DEC from requesting an excessive decrease in fuel flow.

Comparitor 116 may be useful in controlling the output 210 of DEC control circuitry 89 if the DEC control circuitry is using an integral or proportional/integral control. Comparitor circuit 116 receives signal 109 and signal 210. The output of comparitor 116 is a signal indicative of the relative values of signals 109 and 210. Therefore, when signal 210 is limited by signal 109, signals 210 and 109 will be substantially equal and comparitor 116 will have a first output. When the difference between signals 210 and 109 exceeds a predetermined number (i.e., when signal 210 is not limited by signal 109) comparitor 116 will have a second output. Comparitor 116 may, therefore, not be present in all embodiments of the invention.

The output 486 of comparitor 116 may be used in DEC control circuitry 89 to, for example, freeze the output of the integrators (e.g., integrator 470 in FIG. 3) used in the calculation of signal 210.

Output signal 210 may be summed with, for example, a Transient Droop Improvement (TDI Input) signal 252 in summer 250 to form signal 131. The TDI signal is adapted to minimize speed droop when load is applied quickly and may not be present on all embodiments of the invention. Signal 131 is the DEC output signal which controls the HMU fuel flow. As described previously, signal 131 is also fed back to lead-lag circuit 130.

Figure 3:
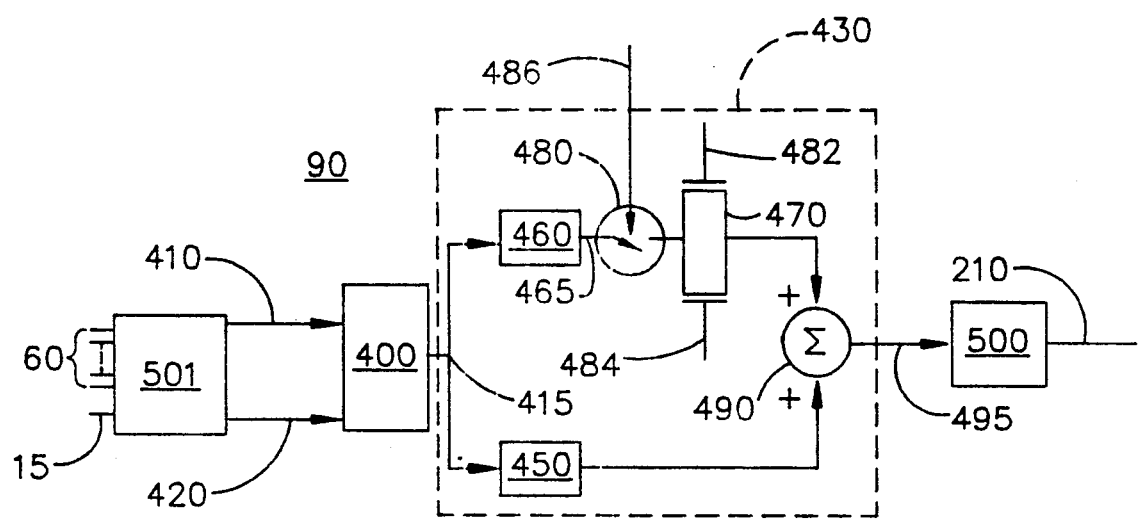
FIG. 3 is a block diagram of a Digital Electronic Control.

FIG. 3 illustrates one possible embodiment of DEC control circuitry 89 according to the present invention. In FIG. 3, circuitry 501, which may comprise, for example, a microprocessor, receives multiple inputs 60 which may include, for example power turbine speed ($N_p$), and turbine gas temperature ($T_{4.5}$), helicopter main rotor speed ($N_r$) and torque signals. Circuitry 501 uses input signals 60 and 15 to calculate output signals 410 and 420. Circuitry 501 may, for example, utilize control laws which simulate functions and responses of the engine.

Minimum select circuit 400 receives at least two input signals. Minimum select circuit 400 selects the signal which provides the most negative trim. Input signal 410 may be, for example, a gas turbine temperature limiter output (T4.5 lim) signal while signal 420 may be, for example, a power turbine governor (NP gov) signal. It will be apparent that the actual inputs to min. select circuit 400 will be dependent on the control system in which the invention is used.

In FIG. 3, the output of min select circuit 400 is directed to proportional/integral controler 430. On the proportional side of proportional/integral controller 430, signal 415 is multiplied by a constant, for example 0.2, in amplifier 450. On the integral side of proportional/integral controller 443, signal 415 is multiplied by a constant of, for example, 0.18 in amplifier 460. Signal 465 is the output of amplifier 460.

It will be apparent to those of skill in the art that controller 430 may be a simple integral control or proportional control as the complexity of a proportional/integral control may not be necessary. As discussed previously, if a simple proportional control is used, the function performed by comparitor 116 may not be necessary.

Signal 465 is integrated in integrator 470 when switch 480 is closed. Switch 480 is controlled by the output of comparitor circuit 116. When input signals 210 and 109 to comparitor 116 are substantially equal, switch 480 is open and the input to integrator 470 is zero. When input signal 210 is less than signal 109, switch 480 is closed and the input to integrator 480 is the output of amplifier 460. The output of integrator 470 is the integrated value of the input. Integrator 470 has a transfer function of, for example:

$$1/S$$

where S is the laplace transform operator.

Integrator 470 includes output limiting inputs 482 and 484 which limit the output of integrator 470 to the range consistent with the DEC's fuel flow demand authority.

The output of integrator 470 is summed with the output of amplifier 450 in summer 490 to form signal 495. Function generator 500 receives signal 495. The transfer function of function generator 500 may be, for example:

$$(1+0.03S)/(1+1.01S)$$

where S is the laplace transform operator.

The output of function generator 500 is signal 210.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What we claim is:

1. A fuel control system for a gas turbine engine including a collective input, an electronic control and a hydromechanical unit, said control system comprising:
    means for generating a first signal representative of total demanded fuel flow;
    means for generating a second signal representative of the maximum allowable fuel flow;
    summing means adapted to sum said first and second signals and obtain a third signal representative of the difference between said first and second signals;
    means for integrating said third signal to obtain a fourth limit signal;
    means for limiting an output signal of said electronic control such that said electronic control output signal does not exceed said fourth signal.

2. A fuel control system according to claim 1 wherein said means for generating said first signal comprises:
    first means for receiving a fuel demand signal representative of fuel flow demand generated by a collective pitch control wherein said means comprises a first lagged rate filter adapted to generate a fifth signal representative of the rate of change of said collective pitch control system;
    second means for receiving a signal representative of fuel flow demand generated by said DEC wherein said means comprises a second lagged rate filter adapted to generate a sixth signal representative of rate of change of said DEC output signal;
    First amplifier means adapted to receive said fifth signal and to multiply said fifth signal by a first predetermined gain constant;
    second amplifier means adapted to receive said sixth signal and to multiply said sixth signal by a second predetermined gain constant;

summing means adapted to add said first amplifier means output to said second amplifier means output to generate said first signal representative of total demanded fuel flow.

3. A fuel control system according to claim 2 wherein:
said integrator output includes limiting means adapted to receive a signal from a summing junction wherein said summing junction is adapted to receive a signal representative of said electronic output signal and add said electronic output signal to a second constant signal.

* * * * *